Feb. 7, 1933. C. KRUSE 1,896,318
FRUIT PEELER
Filed Nov. 26, 1930
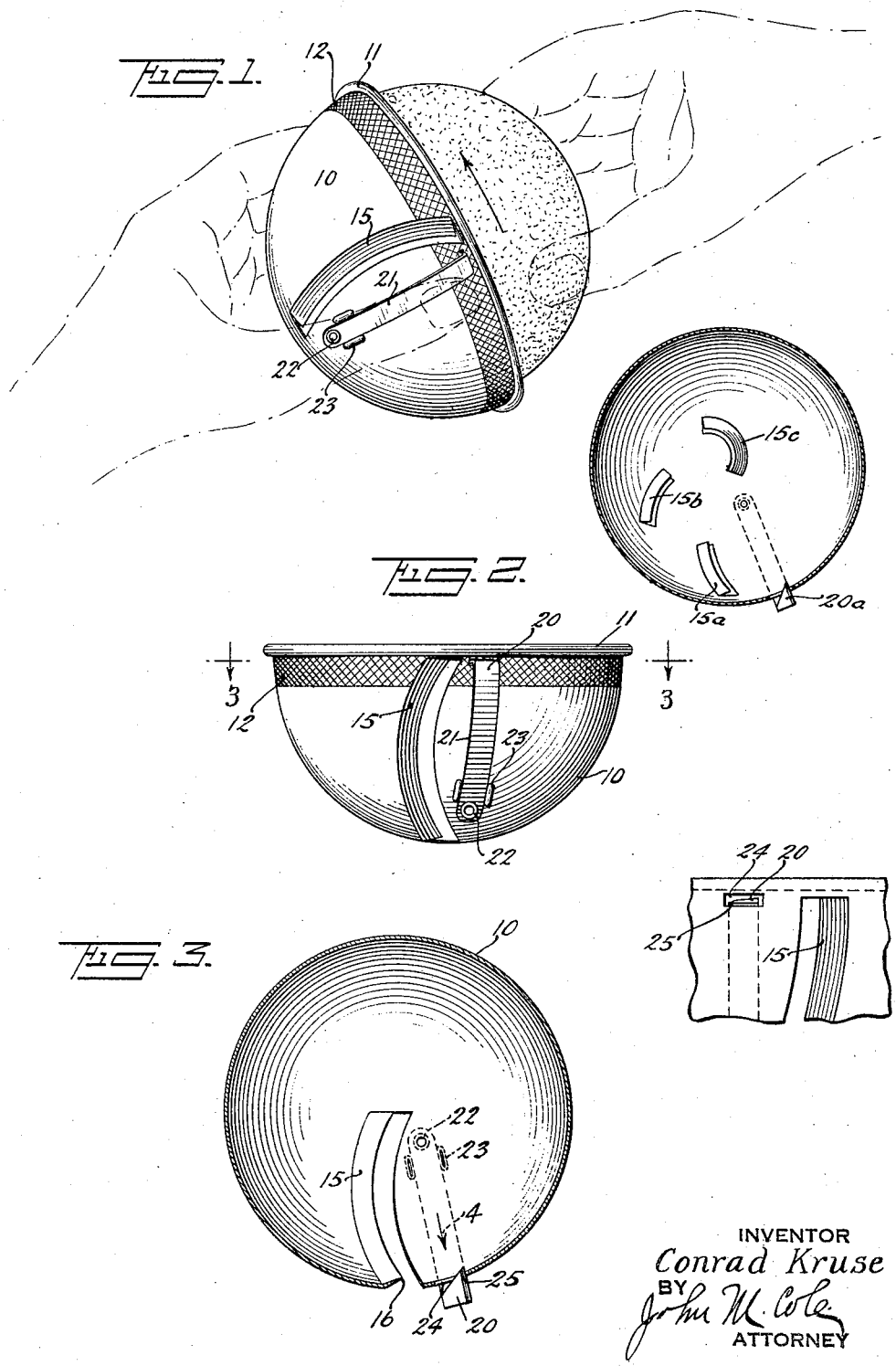
INVENTOR
Conrad Kruse
BY
ATTORNEY Patented Feb. 7, 1933

1,896,318

UNITED STATES PATENT OFFICE

CONRAD KRUSE, OF BROOKLYN, NEW YORK

FRUIT PEELER

Application filed November 26, 1930. Serial No. 498,235.

The present invention relates to fruit peelers and is more particularly directed toward a fruit peeler adapted for peeling fruit having a spherical shape, such for example as oranges.

The present invention contemplates a fruit peeler adapted to remove the peel from substantially one half such an article of fruit at a time, the peel being completely removed from the fruit by merely turning the peeler relative to the fruit. The peeler is made so that it can be held in one hand while the piece of fruit held in the hand is placed in the peeler and is turned so as to bring the rind or peel of fruit against the cutting devices. Preferably two cutting devices are provided, one for slitting the fruit around the central zone, so as to separate the part inside the peeling device from the exposed part and a second or paring knife arranged for removing the peel from the portion which is inside the peeler.

A further object of the invention is to provide a fruit peeler made out of metal stampings in an inexpensive manner so that it can be offered for sale at a low price within the reach of all.

Other and further objects of the invention will appear as the description proceeds.

The accompanying drawing shows, for purposes of illustrating the present invention, two forms in which it may be embodied, it being understood that the forms shown are illustrative of the invention rather than limiting the same.

In the drawing:

Figure 1 is a perspective view illustrating the peeling of an orange;

Figure 2 is a side elevational view of the fruit peeler;

Figure 3 is a sectional view taken on the line 3—3 of Figure 2;

Figure 4 is a fragmentary elevational view taken in the direction of the arrow 4 of Figure 3; and Figure 5 is a view illustrating a modified form of construction.

The form of fruit peeler shown herein is made up out of a simple sheet metal stamping 10, and, where intended for peeling oranges or other citrous fruits, may be substantially hemispherical so as to receive one-half of an orange or other such fruit. It is preferably provided with a stiffening bead 11 around the edge and is knurled or corrugated, as indicated at 12, or is provided with any other suitable configuration to facilitate gripping it, as indicated in Figure 1, so that it may be more securely held in the hand.

The stamping is provided with an inwardly extending knife or cutter indicated at 15. This may be formed by suitably slitting the sheet metal and striking in one side so as to provide a cutting or paring edge as indicated at 16. This edge may be formed sharp in the dies or may be sharpened by a separate operation, if desired. This cutting edge is adapted to engage the rind or peeling of the fruit and to trim it as the fruit is turned in the hemispherical shell.

In order that the rind or peeling of the fruit may be cut about the equator of the fruit, the fruit peeler is provided with a slitting knife, indicated at 20. This slitting knife is in the form of a piece of spring metal 21 which may be secured to the sheet metal stamping 10 in any suitable manner. It is shown in Figures 1 to 4 as being secured by a hollow rivet 22 struck out of the stamping 10, passed through a hole in the strip 21 and riveted over. To prevent the strip 21 from turning on the rivet, suitable bosses or projections 23 are struck up from the stamping to engage the sides of the strip 21. This strip is of spring material, passes through a slot 24 in the stamping as shown, and is provided with a cutting edge 25. It is adapted to be pressed in by the thumb, as will be apparent from Figure 1, and will cut into the surface of the fruit as it is turned about in the peeler, thereby severing the half of the peeling which is inside the stamping from the half which is outside the stamping, so that the skin may be more easily passed out through the opening adjacent the peeling blade 16. For peeling an orange this opening is made comparatively large so as to pass out the thick peeling of the orange. The depth to which the peeler operates will, of course, depend upon the dimensions of the parts, and it can, therefore, be made so as to take care of either very thin skinned oranges or very thick skinned oranges.

In the form shown in Figure 5 the peeling knives 15a, 15b, and 15c form portions of a complete cutter. Each acts on a narrow zone of the fruit peeling and they overlap sufficiently to receive the entire peeling. The slitting knife 20' is formed from the same stamping as the body of the peeler.

It will be apparent that the device may be made in a very inexpensive manner as it requires merely one or two stampings which may be readily secured together.

It is obvious that the invention may be embodied in many forms and constructions, and I wish it to be understood that the particular forms shown are but two of the many forms. Various modifications and changes being possible, I do not otherwise limit myself in any way with respect thereto.

What is claimed is:

1. An orange peeler comprising a hemispherical sheet metal stamping having a reinforcing bead about the edge and an aperture adjacent the edge, and a spring supported knife projecting inwardly through the aperture and adapted to slit an orange peel as the orange is turned in the stamping, the stamping also having an inwardly extending cutter for peeling off the orange peel from the portion of the orange received within the stamping.

2. An orange peeler comprising a hemispherical sheet metal stamping having a reinforcing bead about the edge and an aperture adjacent the edge, and a spring supported knife projecting inwardly through the aperture and adapted to slit an orange peel as the orange is turned in the stamping, the stamping also having an inwardly extending cutter for peeling off the orange peel from the portion of the orange received within the stamping, said cutter being formed of inwardly pressed portions of the sheet metal stamping.

3. A fruit peeler comprising a substantially hemispherical body member to receive an article of fruit, an inwardly extending blade formed on said body member, extending from the edge to substantially the center and disposed adjacent an opening in the body member for cutting the peeling off the article of fruit by turning motion, and a knife mounted on the body member adjacent the edge thereof and extending inwardly therefrom to slit the peeling to disconnect the portion within the body member from the projecting portion.

4. An orange peeler comprising a body member shaped to receive one half of an orange, an inwardly extending cutting knife mounted on said body member adjacent the edge thereof to slit the orange peel on the equator, and a peeling blade conforming to the shape of the body member and fixed thereon to peel the skin off the orange, the body member having a slot adjacent the peeling blade to allow exit of the peeling removed.

CONRAD KRUSE.